United States Patent
Lee

(10) Patent No.: US 9,575,767 B2
(45) Date of Patent: Feb. 21, 2017

(54) ELECTRONIC SYSTEM, CENTRAL PROCESSING UNIT EXPANSION APPARATUS, PORTABLE ELECTRONIC APPARATUS AND PROCESSING METHOD

(71) Applicant: NATIONAL CHENG KUNG UNIVERSITY, Tainan (TW)

(72) Inventor: Sen-Yung Lee, Tainan (TW)

(73) Assignee: National Cheng Kung University, Tainan (TW)

( * ) Notice: Subject to any disclaimer, the term of this patent is extended or adjusted under 35 U.S.C. 154(b) by 347 days.

(21) Appl. No.: 14/264,375

(22) Filed: Apr. 29, 2014

(65) Prior Publication Data

US 2014/0325180 A1     Oct. 30, 2014

(30) Foreign Application Priority Data

Apr. 30, 2013  (TW) .............................. 102115495 A

(51) Int. Cl.
*G06F 9/38*       (2006.01)
*G06F 1/16*       (2006.01)

(52) U.S. Cl.
CPC ........... *G06F 9/3885* (2013.01); *G06F 1/1656* (2013.01)

(58) Field of Classification Search
CPC .............................. G06F 9/3885; G06F 1/1656
See application file for complete search history.

(56) References Cited

U.S. PATENT DOCUMENTS

| | | | | |
|---|---|---|---|---|
| 5,848,250 A | * | 12/1998 | Smith | G06F 13/4072 710/300 |
| 6,192,420 B1 | * | 2/2001 | Tsai | G06F 13/4068 710/10 |
| 6,981,080 B2 | * | 12/2005 | Thompson | G06F 9/4411 710/10 |
| 9,268,728 B2 | * | 2/2016 | Lai | G06F 13/385 |
| 2001/0008000 A1 | * | 7/2001 | Kikinis | G06F 1/1632 710/100 |
| 2002/0133694 A1 | * | 9/2002 | Ray | G06F 9/4411 713/1 |
| 2006/0041707 A1 | * | 2/2006 | Chou | G06F 13/4022 710/316 |

(Continued)

FOREIGN PATENT DOCUMENTS

TW         561347 B     11/2003
TW      200900953 A      1/2009

*Primary Examiner* — Glenn A Auve
(74) *Attorney, Agent, or Firm* — Muncy, Geissler, Olds & Lowe, P.C.

(57) ABSTRACT

An electronic system includes a central processing unit (CPU) expansion apparatus and a portable electronic apparatus. The CPU expansion apparatus has a first CPU connector and a first CPU. The portable electronic apparatus has a second CPU connector and a second CPU. When the first CPU connector is connected to the second CPU connector, a data transmission is implemented between the first CPU and the second CPU. A CPU expansion apparatus, portable electronic apparatus and processing method are also disclosed. With the electronic system, CPU expansion apparatus, portable electronic apparatus and processing method according to the invention, the portable electronic apparatus can be connected to an additional CPU externally and is thereby improved in efficiency of processing and computing.

19 Claims, 4 Drawing Sheets

(56) References Cited

U.S. PATENT DOCUMENTS

| | | | |
|---|---|---|---|
| 2008/0320196 A1* | 12/2008 | Lin | G06F 13/409 710/301 |
| 2010/0228900 A1* | 9/2010 | Wheeler | G06F 13/4072 710/300 |
| 2011/0296070 A1* | 12/2011 | Shih | G06F 13/409 710/300 |
| 2013/0021742 A1* | 1/2013 | Lee | G06F 1/185 361/679.32 |

* cited by examiner

ELECTRONIC SYSTEM, CENTRAL PROCESSING UNIT EXPANSION APPARATUS, PORTABLE ELECTRONIC APPARATUS AND PROCESSING METHOD

CROSS REFERENCE TO RELATED APPLICATIONS

This Non-provisional application claims priority under 35 U.S.C. §119(a) on Patent Application No(s). 102115495 filed in Taiwan, Republic of China on Apr. 30, 2013, the entire contents of which are hereby incorporated by reference.

BACKGROUND OF THE INVENTION

Field of Invention

The invention relates to an electronic system, a central processing unit (CPU) expansion apparatus, a portable electronic apparatus and a processing method.

Related Art

Recently, with the progress of technologies, portable electronic apparatuses, such as smart phones, tablet computers, cameras, video players, widely appear in our daily life and bring various kinds of applications. Actually, a portable electronic apparatus just resembles a small-scale computer, having one or more central processing units (CPU) in charge of data processing and computation.

Besides, the electronic apparatus always needs to be upgraded in processing efficiency to meet the unceasingly increased demand. The solution to that is generally to purchase a new electronic apparatus which has an upgraded CPU or more CPUs. As shown in FIG. 1, a conventional electronic apparatus 3 includes a circuit board 31 and several CPUs 32 disposed on the circuit board 31 to raise the processing efficiency. However, more CPUs 32 will cause the heat dissipation to be more serious, and even the mechanism design needs to be changed. Therefore, the product's cost will be increased a lot while the product's advantage is reduced. Besides, in the conventional art, for raising the whole processing efficiency, several electronic apparatuses can be connected together in series or parallel to achieve the parallel processing.

However, the above methods are not only uneconomical, but also depart from the trend towards lightness and thinness. Besides, when the using demand is raised again, the consumer needs to purchase a new electronic apparatus with higher processing efficiency. Furthermore, every electronic apparatus has limited space therein for accommodating a certain number of CPUs. In addition, more CPUs will result in a more serious problem of heat dissipation, and the mechanism design even needs to be changed therefore, so that the cost is increased a lot.

Therefore, it is an important subject to provide an electronic system, central processing unit expansion apparatus, portable electronic apparatus and processing method so that the processing efficiency of the portable electronic apparatus can be easily enhanced with the lightness and thinness while the heat dissipation problem will not be deteriorated.

SUMMARY OF THE INVENTION

In view of the foregoing subject, an objective of this invention is to provide an electronic system, central processing unit expansion apparatus, portable electronic apparatus and processing method so that the processing efficiency of the portable electronic apparatus can be easily enhanced with the lightness and thinness while the heat dissipation problem will not be deteriorated.

To achieve the above objective, an electronic system according to the invention includes a central processing unit (CPU) expansion apparatus and a portable electronic apparatus. The CPU expansion apparatus has a first CPU connector and a first CPU. The portable electronic apparatus has a second CPU connector and a second CPU. When the first CPU connector is connected to the second CPU connector, a data transmission is implemented between the first CPU and the second CPU.

In one embodiment, the first CPU connector is disposed to the CPU expansion apparatus and exposed.

In one embodiment, the second CPU connector is disposed to the portable electronic apparatus and exposed.

In one embodiment, at least one of the first CPU and the second CPU includes a plurality of central processing units.

In one embodiment, the first CPU connector and the second CPU connector are connected to each other directly or by a connection line.

In one embodiment, the portable electronic apparatus includes an identification unit, which identifies at least one information of the first CPU.

In one embodiment, the information includes the model type, number of pins, function type, computation speed, or cache memory capacity of the first CPU, or any of their combinations.

In one embodiment, the portable electronic apparatus includes an assignation unit, which assigns a first portion of an operation to the first CPU and assigns a second portion of the operation to the second CPU.

In one embodiment, the first CPU or the second CPU comprises a logic module, a storage module and a control module. The control module transmits information to the logic module and then transmits the processed information of the logic module to the storage module.

To achieve the above objective, a CPU expansion apparatus as mentioned above is also disclosed.

To achieve the above objective, a portable electronic apparatus as mentioned above is also disclosed.

To achieve the above objective, a processing method is also disclosed and applied to a CPU expansion apparatus and a portable electronic apparatus. The first CPU expansion apparatus includes a first CPU connector and a first CPU, and the portable electronic apparatus includes a second CPU connector and a second CPU. The processing method comprises steps of: identifying the first CPU by the portable electronic apparatus when the first CPU connector and the second CPU connector are connected to each other; and assigning a first portion of an operation to the first CPU and a second portion of the operation to the second CPU according to the identification result by the portable electronic apparatus.

As mentioned above, according to the electronic system, CPU expansion apparatus, portable electronic apparatus and processing method of this invention, the first CPU connector of the CPU expansion apparatus can be connected to the second CPU connector of the portable electronic apparatus, so that the first CPU of the CPU expansion apparatus is externally connected to the portable electronic apparatus, and thereby the capability of processing and computing of the CPU of the portable electronic apparatus can be enhanced and upgraded. Because the higher processing efficiency is not achieved by increasing the number of the CPU inside the portable electronic apparatus, the product can be kept lightness and thinness. Besides, the heat dissipation problem caused by the additional CPUs can be avoided, and therefore the heat dissipation mechanism needn't be changed so that the product's cost will not increase and the product's advantage can be raised more. In usage, the user just needs to carry a portable electronic apparatus with basic functions, and then, if necessary, makes it connect to the CPU expansion apparatus of this invention for enhancing the whole processing and computing efficiency. The portable electronic apparatus with basic functions is also capable of managing the information and communication between itself and the CPU expansion apparatus. Besides, users can select a proper kind of CPU expansion apparatus according to their requirements. Therefore, users needn't purchase a new electronic system when they want to upgrade the system or apparatus. Besides, users can use a plurality of CPU expansion apparatuses at the same time to enormously enhance the processing efficiency and also avoid the heat dissipation problem.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
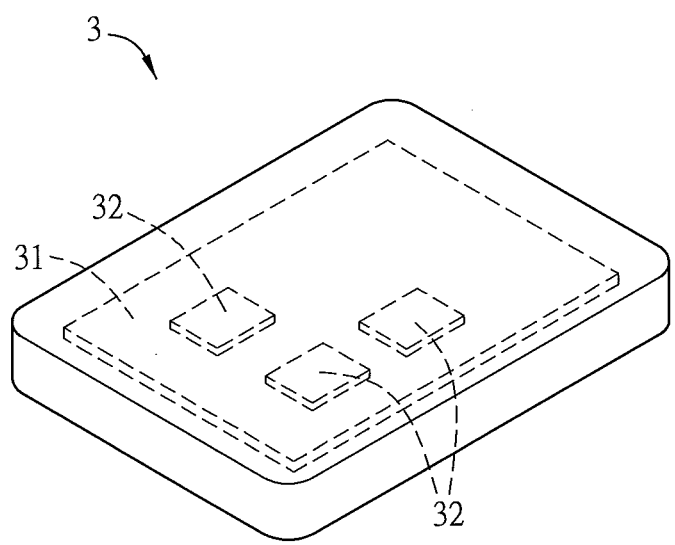
FIG. 1 is a schematic diagram of a conventional electronic apparatus including a plurality of CPUs.
Figure 2:
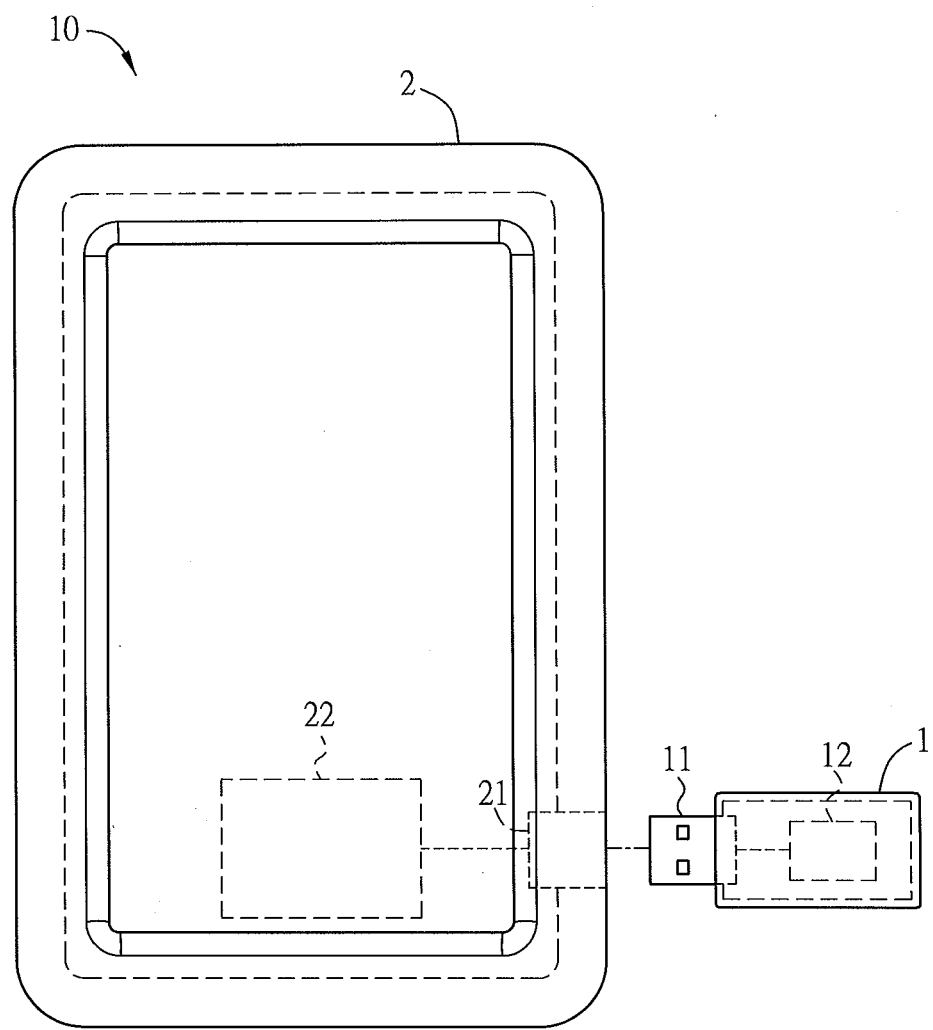
FIG. 2 is a schematic diagram of an electronic system according to a preferred embodiment of the invention.

FIG. 2 is a schematic diagram of an electronic system 10 according to a preferred embodiment of the invention. The electronic system 10 includes a central processing unit (CPU) expansion apparatus 1 and a portable electronic apparatus 2. In the invention, the portable electronic apparatus 2 is not limited in type, which can be a smart phone, tablet computer, camera, video player, etc.

The CPU expansion apparatus 1 includes a first CPU connector 11 and a first CPU 12. Herein, the first CPU connector 11 is disposed to the CPU expansion apparatus 1 and exposed. In the invention, the exposure of the first CPU connector 11 denotes at least a portion thereof can be seen by the user. Besides, in some embodiments, when the first CPU connector 11 is not used, a covering element may be used to cover the first CPU connector 11 for preventing dust or other objects from entering into the first CPU connector 11. Herein, the first CPU connector 11 is not limited in type, which can be, for example, a currently-used high speed interface and is suitable for the data transmission of CPU.

In this embodiment, the first CPU 12 is a CPU or includes a plurality of CPUs to achieve the parallel processing purpose. In this invention, the first CPU 12 also comprehends a microprocessor unit (MPU) and microcontroller unit (MCU) in scope.

The CPU expansion apparatus 1 can further include other units, such as a storage unit to store data, or a display unit to display special information such as the current efficiency state of the first CPU 12. The first CPU 12 is electrically connected to the first CPU connector 11 by, for example, a bus line. Otherwise, the first CPU 12 and first CPU connector 11 are both disposed on a circuit board and electrically connected to each other by the layout on the circuit board. Otherwise, the first CPU 12 and first CPU connector 11 can be electrically connected to each other by other kinds of electronic elements.

The portable electronic apparatus 2 includes a second CPU connector 21 and a second CPU 22. Herein, the second CPU connector 21 is disposed to the portable electronic apparatus 2 and exposed. In the invention, the exposure of the second CPU connector 21 denotes at least a portion thereof can be seen by the user. Besides, in some embodiments, when the second CPU connector 21 is not used, a covering element may be used to cover the second CPU connector 11 for preventing dust or other objects from entering into the second CPU connector 21. Herein, the second CPU connector 21 is not limited in type, which can be the same as the first CPU connector 11 for example.

In this embodiment, the second CPU 22 is a CPU or includes a plurality of CPUs to achieve the parallel processing purpose. In this invention, the second CPU 22 also comprehends a microprocessor unit (MPU) and microcontroller unit (MCU) in scope.

The portable electronic apparatus 2 can further include other units, such as a storage unit to store data, a display unit to display images, or a communication unit to perform the communication. The functional units further included by the portable electronic apparatus 2 can be determined according to the applications, and therefore they are not described here for conciseness. The second CPU 22 is electrically connected to the second CPU connector 21 by, for example, a bus line. Otherwise, the second CPU 22 and second CPU connector 21 are both disposed on a circuit board and electrically connected to each other by the layout on the circuit board. Otherwise, the second CPU 22 and second CPU connector 21 can be electrically connected to each other by other kinds of electronic elements.

In this embodiment, the first CPU connector 11 can be electrically connected to the second CPU connector 21. For example, the first CPU connector 11 is inserted into the second CPU connector 21, or is connected to the second CPU connector 21 through a connection line, both for achieving the mutual electrical connection. When the first CPU connector 11 is connected to the second CPU connector 21, the data transmission can be carried out between the first CPU 12 and the second CPU 22 through the first CPU connector 11 and second CPU connector 21. Thereby, the first CPU 12 of the CPU expansion apparatus 1 can be externally connected to the portable electronic apparatus 2, so that the portable electronic apparatus 2 is improved in processing and computing capability.

Figure 3:
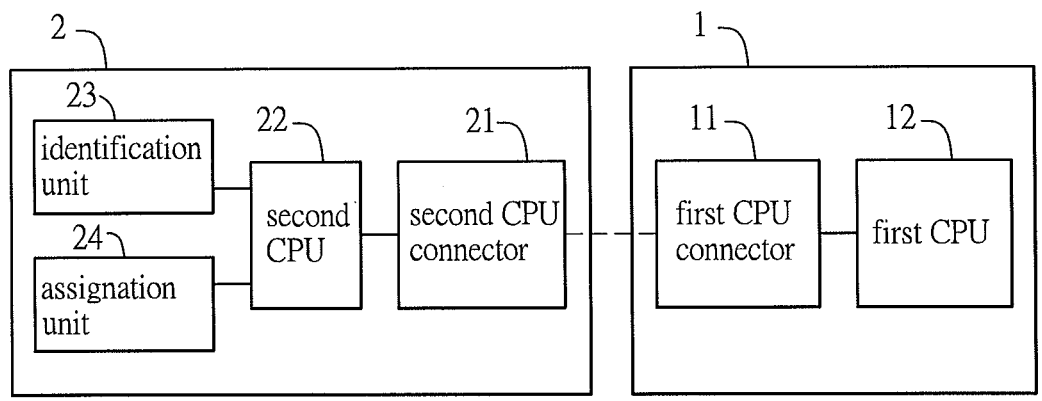
FIG. 3 is a schematic block diagram of the CPU expansion apparatus and portable electronic apparatus according the preferred embodiment of the invention.

FIG. 3 is a schematic block diagram of the CPU expansion apparatus 1 and portable electronic apparatus 2 according the preferred embodiment of the invention. As shown in FIG. 3, the portable electronic apparatus 2 can further include an identification unit 23, which can identify at least one information of the first CPU 12. The information includes, for example, the model type, number of pins, function type, computation speed, or cache memory capacity of the first CPU 12, or any of their combinations. The identification unit 23 identifies the first CPU 12 to obtain the information of the first CPU 12 for the subsequent processing. In this embodiment, the identification unit 23 is electrically connected to the second CPU 22 for example.

The portable electronic apparatus 2 can further include an assignation unit 24, which can assign a first portion of an operation to the first CPU 12 and assign a second portion of the operation to the second CPU 22. The assignation unit 24 can execute the assignation according to the information that is obtained in the above-mentioned identification procedure. Or, the assignation unit 24 can execute the assignation further according to the weight relationship between the primary role (e.g. the second CPU 22) and the secondary role (e.g. the first CPU 12). With the assignation procedure, the whole processing efficiency can be raised a lot. In this embodiment, the assignation unit 24 is electrically connected to the second CPU 22 for example.

Figure 4:
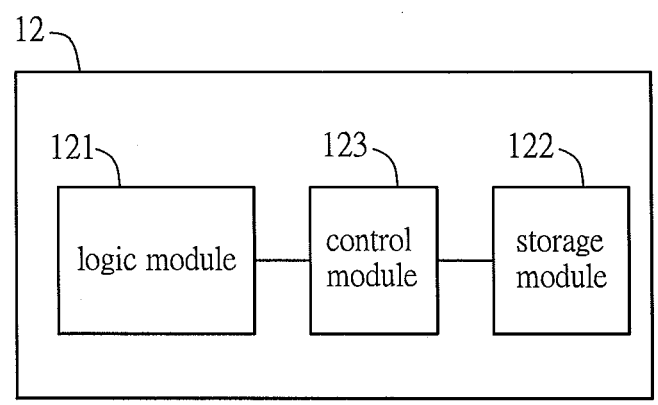
FIG. 4 is a schematic block diagram of the first CPU (or the second CPU) according to a preferred embodiment of the invention.

FIG. 4 is a schematic block diagram of the first CPU 12 (or the second CPU 22) according to a preferred embodiment of the invention. As shown in FIG. 4, the first CPU 12 can include a logic module 121, a storage module 122 and a control module 123. The control module 123 is electrically connected to the logic module 121 and the storage module 122. The control module 123 can transmit information to the logic module 121, and then transmit the processed information of the logic module 121 to the storage module 122. Since the first CPU 12 or the second CPU 22 can be embodied as a conventional CPU, they are not described here for conciseness. Besides, the CPU of the invention also comprehends a microprocessor unit (MPU) and microcontroller unit (MCU) in scope, and can include a plurality of CPUs to achieve the capability of parallel processing.

Figure 5:
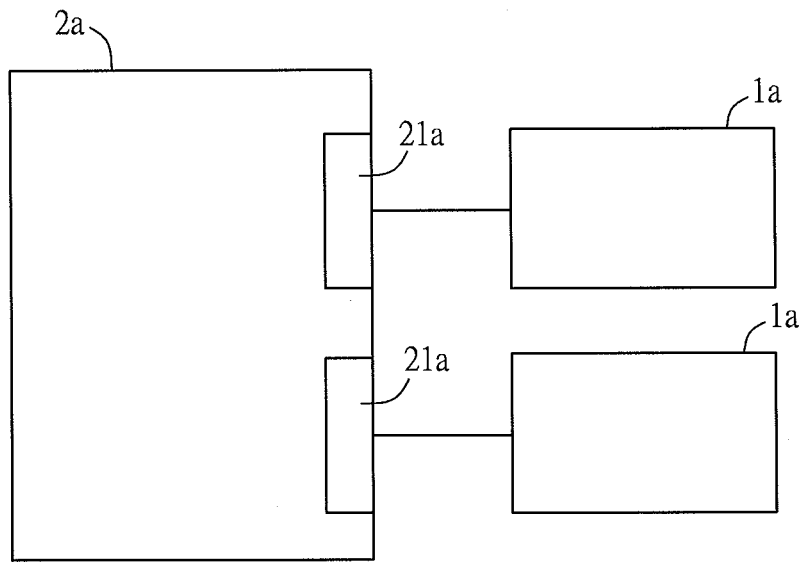
FIG. 5 is a schematic diagram of another portable electronic apparatus in cooperation with a plurality of CPU expansion apparatuses according to the preferred embodiment of the invention.

The portable electronic apparatus of this invention also can externally connect to a plurality of the CPU expansion apparatuses. As shown in FIG. 5, a portable electronic apparatus 2a of an embodiment includes a plurality of the second CPU connectors 21a, which can connect to a plurality of the CPU expansion apparatuses 1a correspondingly for further enhancing the capability of processing and computation. In other embodiments, the second CPU connector of the portable electronic apparatus can connect to an interface expansion element, and the interface expansion element has a plurality of connectors to connect to a plurality of the CPU expansion apparatuses correspondingly. Therefore, further enhancing the capability of processing and computation of the whole system also can be achieved.

To be noted, the above-mentioned CPU expansion apparatus 1 is also a CPU expansion apparatus according to a preferred embodiment of the invention. The above-mentioned portable electronic apparatus 2 is also a portable electronic apparatus according to a preferred embodiment of the invention, and the portable electronic apparatus 2a can be regarded as a variation of the portable electronic apparatus according to the preferred embodiment of the invention.

Figure 6:
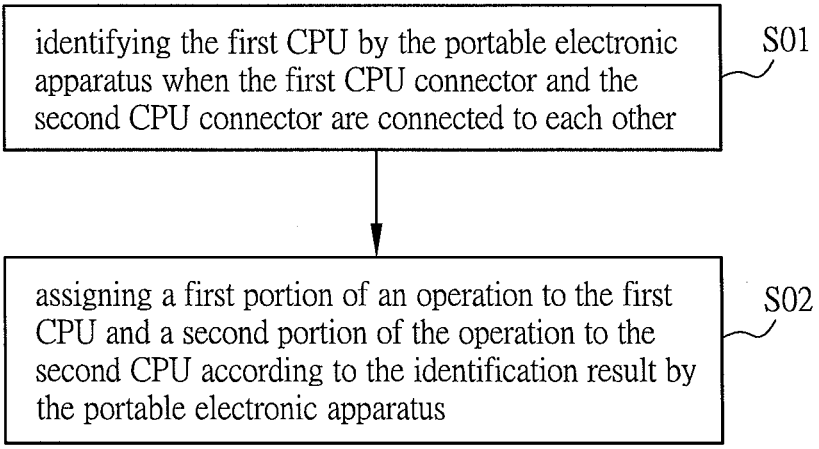
FIG. 6 is a flow chart of a processing method according to a preferred embodiment of the invention.

FIG. 6 is a flow chart of a processing method according to a preferred embodiment of the invention. The processing method of this embodiment is applied to a CPU expansion apparatus and a portable electronic apparatus, and for example to the above-mentioned CPU expansion apparatus 1 and portable electronic apparatus 2. The processing method includes steps of: identifying the first CPU 12 by the portable electronic apparatus 2 when the first CPU connector 11 and the second CPU connector 21 are connected to each other (S01); and assigning a first portion of an operation to the first CPU 12 and a second portion of the operation to the second CPU 22 according to the identification result by the portable electronic apparatus 2 (S02). Since the technical features of the processing method of this embodiment are also illustrated in the above embodiments of the electronic system 10, CPU expansion apparatus 1 and portable electronic apparatus 2, they are not described here for conciseness.

In summary, according to the electronic system, CPU expansion apparatus, portable electronic apparatus and processing method of this invention, the first CPU connector of the CPU expansion apparatus can be connected to the second CPU connector of the portable electronic apparatus, so that the first CPU of the CPU expansion apparatus is externally connected to the portable electronic apparatus, and thereby the capability of processing and computing of the CPU of the portable electronic apparatus can be enhanced and upgraded. Because the higher processing efficiency is not achieved by increasing the number of the CPU inside the portable electronic apparatus, the product can be kept lightness and thinness. Besides, the heat dissipation problem caused by the additional CPUs can be avoided, and therefore the heat dissipation mechanism needn't be changed so that the product's cost will not increase and the product's advantage can be raised more. In usage, the user just needs to carry a portable electronic apparatus with basic functions, and then, if necessary, makes it connect to the CPU expansion apparatus of this invention for enhancing the whole processing and computing efficiency. The portable electronic apparatus with basic functions is also capable of managing the information and communication between itself and the CPU expansion apparatus. Besides, users can select a proper kind of CPU expansion apparatus according to their requirements. Therefore, users needn't purchase a new electronic system when they want to upgrade the system or apparatus. Besides, users can use a plurality of CPU expansion apparatuses at the same time to enormously enhance the processing efficiency and also avoid the heat dissipation problem.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An electronic system, comprising:
    a central processing unit (CPU) expansion apparatus including a first CPU connector and a first CPU; and
    a portable electronic apparatus including a second CPU connector and a second CPU, wherein when the first CPU connector and the second CPU connector are connected to each other, a data transmission is implemented between the first CPU and the second CPU,
    wherein the portable electronic apparatus includes an assignation unit, which assigns a first portion of an operation to the first CPU and assigns a second portion of the operation to the second CPU.

2. The electronic system as recited in claim 1, wherein the first CPU connector is exposed from the CPU expansion apparatus.

3. The electronic system as recited in claim 1, wherein the second CPU connector is exposed from the portable electronic apparatus.

4. The electronic system as recited in claim 1, wherein at least one of the first CPU and the second CPU includes a plurality of central processing units.

5. The electronic system as recited in claim 1, wherein the first CPU connector and the second CPU connector are connected to each other directly or by a connection line.

6. The electronic system as recited in claim 1, wherein the portable electronic apparatus includes an identification unit, which identifies at least one information of the first CPU.

7. The electronic system as recited in claim 6, wherein the information includes the model type, number of pins, function type, computation speed, or cache memory capacity of the first CPU, or any of their combinations.

8. The electronic system as recited in claim 1, wherein the first CPU or the second CPU comprises:
    a logic module;
    a storage module; and
    a control module transmitting information to the logic module and then transmitting a processed information of the logic module to the storage module.

9. A CPU expansion apparatus configured to be cooperated with a portable electronic apparatus and comprising:
    a first CPU connector and a first CPU,
    wherein the portable electronic apparatus includes a second CPU connector and a second CPU, when the first CPU connector and the second CPU connector are connected to each other, a data transmission is implemented between the first CPU and the second CPU, and the portable electronic apparatus includes an assignation unit, which assigns a first portion of an operation to the first CPU and assigns a second portion of the operation to the second CPU.

10. The CPU expansion apparatus as recited in claim 9, wherein the first CPU connector is exposed from the CPU expansion apparatus.

11. The CPU expansion apparatus as recited in claim 9, wherein the first CPU includes a plurality of central processing units.

12. The CPU expansion apparatus as recited in claim 9, wherein the first CPU comprises:
    a logic module;
    a storage module; and
    a control module transmitting information to the logic module and then transmitting a processed information of the logic module to the storage module.

13. A portable electronic apparatus configured to be cooperated with a CPU expansion apparatus including a first CPU connector and a first CPU, comprising:
    a second CPU connector and a second CPU, wherein when the first CPU connector and the second CPU connector are connected to each other, a data transmission is implemented between the first CPU and the second CPU, and the portable electronic apparatus includes an assignation unit, which assigns a first portion of an operation to the first CPU and assigns a second portion of the operation to the second CPU.

14. The portable electronic apparatus as recited in claim 13, wherein the second CPU connector is exposed from the portable electronic apparatus.

15. The portable electronic apparatus as recited in claim 13, wherein the second CPU includes a plurality of central processing units.

16. The portable electronic apparatus as recited in claim 13, comprising:
    an identification unit identifying at least one information of the first CPU.

17. The portable electronic apparatus as recited in claim 16, wherein the information includes the model type, number of pins, function type, computation speed, or cache memory capacity of the first CPU, or any of their combinations.

18. The portable electronic apparatus as recited in claim 13, wherein the second CPU comprises:
    a logic module;
    a storage module; and
    a control module transmitting information to the logic module and then transmitting a processed information of the logic module to the storage module.

19. A processing method applied to a CPU expansion apparatus and a portable electronic apparatus, wherein the first CPU expansion apparatus includes a first CPU connector and a first CPU, and the portable electronic apparatus includes a second CPU connector and a second CPU, the processing method comprising steps of:
    identifying the first CPU by the portable electronic apparatus when the first CPU connector and the second CPU connector are connected to each other; and
    assigning a first portion of an operation to the first CPU and a second portion of the operation to the second CPU according to the identification result by the portable electronic apparatus.

* * * * *